United States Patent
Colell et al.

(10) Patent No.: US 11,964,419 B2
(45) Date of Patent: Apr. 23, 2024

(54) METHOD AND DEVICE FOR CONTROLLING A THICKNESS PROFILE OF A FILM WEB

(71) Applicant: Windmöller & Hölscher KG, Lengerich (DE)

(72) Inventors: Waldemar Colell, Lengerich (DE); Bernd-Alexander Groepper, Lengerich (DE); Torsten Schmitz, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 180 days.

(21) Appl. No.: 17/291,638

(22) PCT Filed: Nov. 5, 2019

(86) PCT No.: PCT/EP2019/080227
§ 371 (c)(1),
(2) Date: May 6, 2021

(87) PCT Pub. No.: WO2020/094635
PCT Pub. Date: May 14, 2020

(65) Prior Publication Data
US 2021/0402670 A1  Dec. 30, 2021

(30) Foreign Application Priority Data
Nov. 6, 2018 (DE) ..................... 10 2018 127 671.0

(51) Int. Cl.
*B29C 48/92* (2019.01)
*B29C 48/08* (2019.01)
*B29L 7/00* (2006.01)

(52) U.S. Cl.
CPC .............. *B29C 48/92* (2019.02); *B29C 48/08* (2019.02); *B29C 2948/92647* (2019.02); *B29C 2948/92904* (2019.02); *B29L 2007/008* (2013.01)

(58) Field of Classification Search
None
See application file for complete search history.

(56) References Cited

U.S. PATENT DOCUMENTS 3,940,221 A  2/1976 Nissel
4,445,837 A  5/1984 Cisar et al.
(Continued)

FOREIGN PATENT DOCUMENTS

AT  161389  10/1990
CA  2055163  5/1992
(Continued)

OTHER PUBLICATIONS

JP2001310372A_machine _translation (Year: 2001).*
(Continued)

*Primary Examiner* — Robert J Grun (57) ABSTRACT

The invention relates to a method for controlling a thickness profile (DP) of a film track (FB) along a transverse direction (QR) by means of a plurality of adjusting means (120) for adjusting a slot opening (112) of a discharge nozzle (110) of the flat film machine (100), comprising the following steps:
 acquiring a thickness profile (DP) along the transverse direction (QR) of the film track (FB) transverse to a production direction (PR) of the flat film machine (100),
 comparing at least a partial section of the acquired thickness profile (DP) with a preset profile (VP),
 determining at least one local profile deviation (PA) in a deviation section (AA) as a result of the comparison,
(Continued)

generating at least one controlling intervention for the adjustment of at least one adjusting means (120) in an intervention section (EA) different from the deviation section (AA).

17 Claims, 4 Drawing Sheets

(56) References Cited

U.S. PATENT DOCUMENTS

| | | | |
|---|---|---|---|
| 4,454,082 | A | 6/1984 | Cisar et al. |
| 4,454,084 | A | 6/1984 | Smith et al. |
| 4,592,710 | A | 6/1986 | Reifenhaeuser et al. |
| 4,753,587 | A | 6/1988 | Djordjevic et al. |
| 4,781,562 | A | 11/1988 | Sano et al. |
| 4,804,557 | A | 2/1989 | Anthony, Jr. et al. |
| 5,208,047 | A | 5/1993 | Cloeren et al. |
| 5,587,184 | A | 12/1996 | Leonard et al. |
| 5,770,129 | A | 6/1998 | Monti |
| 6,099,290 | A | 8/2000 | Gross |
| 8,702,414 | B1 | 4/2014 | Pitsch et al. |
| 9,302,420 | B1 | 4/2016 | Darrow et al. |
| 10,272,609 | B2 | 4/2019 | Pitsch |
| 10,456,969 | B2 | 10/2019 | Pozgainer et al. |
| 2002/0175434 | A1 | 11/2002 | Uehara et al. |
| 2003/0050717 | A1 | 3/2003 | Hirata et al. |
| 2011/0006452 | A1 | 1/2011 | Bayer et al. |
| 2012/0315378 | A1 | 12/2012 | Yapel et al. |
| 2013/0127086 | A1 | 5/2013 | Derks |
| 2021/0402667 | A1 | 12/2021 | Colell et al. |

FOREIGN PATENT DOCUMENTS

| | | |
|---|---|---|
| CH | 702058 | 4/2011 |
| CN | 1197421 | 10/1998 |
| CN | 1392831 | 1/2003 |
| CN | 2905410 Y | 5/2007 |
| CN | 101365571 | 2/2009 |
| CN | 102712125 | 10/2012 |
| CN | 103747938 | 4/2014 |
| CN | 104552869 | 4/2015 |
| CN | 106584736 | 4/2017 |
| CN | 107175804 | 9/2017 |
| CN | 107175808 | 9/2017 |
| CN | 107322905 | 11/2017 |
| CN | 107379494 | 11/2017 |
| CN | 107399072 | 11/2017 |
| CN | 107866958 | 4/2018 |
| CN | 112118948 | 12/2020 |
| DE | 2229924 | 1/1973 |
| DE | 3531005 | 3/1986 |
| DE | 4020728 | 1/1991 |
| DE | 19535930 | 1/1997 |
| DE | 19855751 | 6/2000 |
| DE | 10117946 | 10/2002 |
| DE | 102016112121 | 1/2018 |
| EP | 0079052 | 5/1983 |
| EP | 0484711 | 5/1992 |
| EP | 1964659 | 9/2008 |
| EP | 2657000 | 10/2013 |
| EP | 2837484 | 2/2015 |
| EP | 2865511 | 4/2015 |
| FR | 2878183 | 5/2006 |
| GB | 2162119 | 1/1986 |
| JP | 63-045024 | 2/1988 |
| JP | 01-232018 | 9/1989 |
| JP | 01-257023 | 10/1989 |
| JP | 06-071729 | 3/1994 |
| JP | 07-001561 | 1/1995 |
| JP | 07-329147 | 12/1995 |
| JP | 08-085145 | 4/1996 |
| JP | 08-267536 | 10/1996 |
| JP | 08-276491 | 10/1996 |
| JP | 09-225995 | 9/1997 |
| JP | 09-309138 | 12/1997 |
| JP | 10-058518 | 3/1998 |
| JP | 2000-094497 | 4/2000 |
| JP | 2001-030340 | 2/2001 |
| JP | 2001-310372 | 11/2001 |
| JP | 2002-096371 | 4/2002 |
| JP | 2003-089146 | 3/2003 |
| JP | 2004-122434 | 4/2004 |
| JP | 2013-039677 | 2/2013 |
| JP | 2013-240897 | 12/2013 |
| JP | 2014-019079 | 2/2014 |
| JP | 2016-179460 | 10/2016 |
| LU | 65607 | 10/1972 |
| WO | WO 2012/170713 | 12/2012 |
| WO | WO 2013/021245 | 2/2013 |
| WO | WO 2020/094631 | 5/2020 |
| WO | WO 2021/170713 | 9/2021 |

OTHER PUBLICATIONS

International Preliminary Report on Patentability dated May 11, 2021 From the International Bureau of WIPO Re. Application No. PCT/EP2019/080227. (7 Pages).
Internationaler Recherchenbericht und Schriftlicher Bescheid [International Search Report and the Written Opinion] dated Jan. 30, 2020 From the International Searching Authority Re. Application No. PCT/EP2019/080227 and Its Translation of Search Report Into English. (13 Pages).
Pruefungsantrag [Request for Examination] dated Jul. 3, 2019 From the Deutsches Patent- und Markenamt [German Patent and Trademark Office] Re. Application No. 102018127671.0 and Its Summary in English. (6 Pages).
Prüfungsbescheid [Notice of Examination] dated Apr. 9, 2022 From the Deutsches Patent- und Markenamt [German Patent and Trademark Office] Re. Application No. 102018127671.0 and Its Summary in English. (7 Pages).
Notification of Office Action and Search Report dated Jul. 19, 2022 From the State Intellectual Property Office of the People's Republic of China Re. Application No. 201980071369.2 and Its Summary in English. (14 Pages).
Notification of Office Action dated Mar. 31, 2023 From the State Intellectual Property Office of the People's Republic of China Re. U.S. Appl. No. 17/291,638 and Its Translation Into English. (33 pages).
Mitteilung Gemäß Artikel 94(3) EPÜ [Communication Pursuant to Article 94(3) EPC] dated Sep. 11, 2023 From the European Patent Office Re. Application No. 19798295.2 and Its Translation Into English. (10 Pages).
International Preliminary Report on Patentability dated May 8, 2020 From the International Preliminary Examining Authority Re. Application No. PCT/EP2019/062437. (8 Pages).
International Preliminary Report on Patentability dated May 11, 2021 From the International Bureau of WIPO Re. Application No. PCT/EP2019/080254. (7 Pages).
International Preliminary Report on Patentability dated May 18, 2020 From the International Preliminary Examining Authority Re. Application No. PCT/EP2019/062429. (7 Pages).
International Preliminary Report on Patentability dated Sep. 18, 2020 From the International Preliminary Examining Authority Re. Application No. PCT/EP2019/062429. (21 Pages).
International Preliminary Report on Patentability dated Sep. 29, 2020 From the International Preliminary Examining Authority Re. Application No. PCT/EP2019/062437. (8 Pages).
Internationaler Recherchenbericht und Schriftlicher Bescheid International Search Report and the Written Opinion] dated Feb. 3, 2020 From the International Searching Authority Re. Application No. PCT/EP2019/080220 and Its Translation of Search Report Into English. (13 Pages).
Internationaler Recherchenbericht und Schriftlicher Bescheid [International Search Report and the Written Opinion] dated Aug. 19, 2019 From the International Searching Authority Re. Application No. PCT/EP2019/062429. (16 Pages).

(56) References Cited

OTHER PUBLICATIONS

Internationaler Recherchenbericht und Schriftlicher Bescheid [International Search Report and the Written Opinion] dated Feb. 19, 2020 From the International Searching Authority Re. Application No. PCT/EP2019/080254 and Its Translation Into English. (20 Pages).
Internationaler Recherchenbericht und Schriftlicher Bescheid [International Search Report and the Written Opinion] dated Aug. 21, 2019 From the International Searching Authority Re. Application No. PCT/EP2019/062437. (17 Pages).
Interview Summary dated Sep. 26, 2023 from the US Patent and Trademark Office Re. U.S. Appl. No. 17/291,628. (2 pages).
Mitteilung Gemäß Artikel 94(3) EPÜ [Communication Pursuant to Article 94(3) EPC] dated Nov. 18, 2021 From the European Patent Office Re. Application No. 19725089.7. (7 Pages).
Mitteilung Gemäß Artikel 94(3) EPÜ [Communication Pursuant to Article 94(3) EPC] dated Nov. 19, 2021 From the European Patent Office Re. Application No. 19725087.1 and Its Summary in English. (8 Pages).
Mitteilung Gemäß Artikel 94(3) EPÜ [Communication Pursuant to Article 94(3) EPC] dated Jun. 21, 2022 From the European Patent Office Re. Application No. 19725087.1 and Its Summary in English. (7 Pages).
Mitteilung Gemäß Artikel 94(3) EPÜ [Communication Pursuant to Article 94(3) EPC] dated Jul. 25, 2023 From the European Patent Office Re. Application No. 19798293.7 and Its Translation Into English. (10 Pages).
Mitteilung Gemäß Artikel 94(3) EPÜ [Communication Pursuant to Article 94(3) EPC] dated Jun. 28, 2022 From the European Patent Office Re. Application No. 19725089.7 and Its Summary in English. (8 Pages).
Mitteilung nach Regel 114(2) EPÜ [Third Party Observation] dated Aug. 2, 2021 From the European Patent Office Re. Application No. 19725087.1. (16 Pages).
Mitteilung nach Regel 114(2) EPÜ [Third Party Observation] dated Aug. 2, 2021 From the European Patent Office Re. Application No. 19725089.7. (21 Pages).
Notification of Grant of Patent for Invention dated Nov. 22, 2022 From the China National Intellectual Property Office Re. Application No. 201980065872.7 and Its Translation Into English. (12 Pages).
Notification of Office Action and Search Report dated Mar. 28, 2022 From the State Intellectual Property Office of the People's Republic of China Re. Application No. 201980065872.7 together with English Summary.. (9 Pages).
Notification of Office Action and Search Report dated Dec. 2, 2021 From the State Intellectual Property Office of the People's Republic of China Re. Application No. 201980032808.9 and Its Summary in English. (9 Pages).
Notification of Office Action and Search Report dated Jul. 21, 2022 From the State Intellectual Property Office of the People's Republic of China Re. Application No. 201980071150.2. (10 Pages).
Notification of Office Action and Search Report dated Apr. 27, 2022 From the State Intellectual Property Office of the People's Republic of China Re. Application No. 201980065872.7 and Its Summary in English. (7 Pages).
Notification of Office Action and Search Report dated Aug. 28, 2023 From the China National Intellectual Property Administration Re. Application No. 201980071150.2 and Its Translation of Office Action Into English. (39 Pages).
Notification of Office Action dated Feb. 11, 2023 From the China National Intellectual Property Administration Re. Application No. 201980071150.2 and Its Translation of Office Action Into English. (23 Pages).
Notification of Office Action dated Jan. 12, 2023 From the China National Intellectual Property Office Re. Application No. 201980032808.9 and Its Translation of Office Action Into English. (12 Pages).
Notification of Office Action dated Jun. 17, 2022 From the China National Intellectual Property Administration Re. Application No. 201980032808.9 and Its Translation of Office Action Into English and Its Summary in English. (6 Pages).
Notification to Grant A Patent dated Jan. 20, 2023 From the State Intellectual Property Office of the People's Republic of China Re. Application No. 201980045567.1. (2 Pages).
Official Action dated Jun. 23, 2023 from the US Patent and Trademark Office Re. U.S. Appl. No. 17/291,628. (12 pages).
Pruefungsantrag [Request for Examination] dated Jul. 3, 2019 From the Deutsches Patent- und Markenamt [German Patent and Trademark Office] Re. Application No. 102018127673.7 and Its Summary in English. (6 Pages).
Pruefungsantrag [Request for Examination] dated Jul. 4, 2019 From the Deutsches Patent- und Markenamt [German Patent and Trademark Office] Re. Application No. 102018127670.2 and Its Summary in English. (6 Pages).
Pruefungsantrag [Request for Examination] dated Feb. 16, 2022 From the Deutsches Patent- und Markenamt [German Patent and Trademark Office] Re. Application No. 10 2018 127 670.2. (4 Pages).
Prüfungsbescheid [Notice of Examination] dated Nov. 26, 2022 From the Deutsches Patent- und Markenamt [German Patent and Trademark Office] Re. Application No. 102018127673.7 and Its Summary in English. (6 Pages).
Restriction Official Action dated Mar. 23, 2023 from the US Patent and Trademark Office Re. U.S. Appl. No. 17/291,628. (6 pages).
Bezigian "A Survey of Current Bead Reduction Die Technology", PLC Technologies Consulting, p. 1-13, May 14, 1997.
Black Clawson Converting Machinery Corporation "Operation Manual for the Black Clawson R.O.I. Die", Black Clawson Converting Machinery Corporation, p. 1-36, Jan. 16, 1998.
Dai et al. "Optical Interferometry for Thickness Measurement of Opaque Thin Films and the Influence of Step Fabrication", Vacuum, 44(5): Sep. 8-12, 2007.
Egan Davis-Standard "Instructions for Operating the Egan Davis-Standard Millenium Converting Line—Egan Davis-Standard Series 50A Die With Internal Deckles", EGAN Davis-Standard Instruction Manual, XP055861737, p. 1-35, Feb. 1999.
Götz et al. "Simulation and Optimization of Film Casting Processes", Progress in Industrial Mathematics at EMCI 2008, 15: 603-609, Published Online Jan. 1, 2010.
Keller "Affidavit by Mr. Ricky Keller", p. 1-3, Including Exhibits A, B and C, p. 4-43, Jul. 15, 2021.
Vlachopoulos et al. "Flat Film and Sheet Dies", Design of Extrusion Forming Tools, Chap.4: 113-140, Dec. 2012.

\* cited by examiner

METHOD AND DEVICE FOR CONTROLLING A THICKNESS PROFILE OF A FILM WEB

RELATED APPLICATIONS

This application is a National Phase of PCT Patent Application No. PCT/EP2019/080227 having International filing date of Nov. 5, 2019, which claims the benefit of priority of German Patent Application No. 10 2018 127 671.0 filed on Nov. 6, 2018. The contents of the above applications are all incorporated by reference as if fully set forth herein in their entirety.

FIELD AND BACKGROUND OF THE INVENTION

The present invention relates to a method for controlling a thickness profile of a film track and to a controlling device for carrying out such a method.

It is known that flat film machines are used to produce film products. For this purpose, the flat film machines are equipped with a plurality of extrusion devices which are able to provide individual layers of the film track with similar, identical or different flowable extrusion materials. In total, the film track will have a plurality of different layers, so that depending on the material composition and layer composition, the film track can comprise a different quality with different functional properties. Among other things, a defined thickness distribution of the film track in the longitudinal direction as well as in the transverse direction is decisive for the quality of the produced film track. In particular, in the transverse direction, relative to the conveying direction of the film machine or the production direction of the film machine, thickness jumps in the thickness profile are risky or lead to quality losses. Since the flat film track is usually subsequently wound onto a winding shaft, even small differences in the thickness profile can add up, since these are always superimposed at the same point during winding. In this case, there is a risk that so-called piston rings are formed, which make the film inferior in terms of quality or even render the film track unusable. It is also possible to coat or laminate the melt. For example, one or more flat tracks can be added to the melt for this purpose.

In known solutions, a thickness profile in the transverse direction of the film track is monitored manually or automatically and adjusted accordingly via adjusting means at a discharge nozzle of the film device. One or more controlling interventions can be used to vary the nozzle discharge slot at such a discharge nozzle at adjusting means, for example in the form of thermal bolts. The application of a defined preset temperature, electrical preset voltage or heating time as a controlling intervention can lead to thermal expansion of the respective adjusting bolt so that it reduces the discharge slot by mechanical action on a nozzle lip. When the temperature at such an adjusting bolt is reduced, the reverse process takes place.

The disadvantage of the known solutions is that transverse effects are not taken into account or are only taken into account manually when adjusting the adjusting means. In other words, the adjusting means are only controlled at the point where a desired effect is to be achieved in the thickness profile.

SUMMARY OF THE INVENTION

It is an object of the present invention to at least partially eliminate the disadvantages described above. In particular, it is an object of the present invention to provide a faster, more efficient and/or better possibility of controlling the thickness profile of the film track in a cost-effective and simple manner.

The foregoing object is solved by a method with the features of claim 1 and a controlling device with the features of claim 17. Further features and details of the invention result from the dependent claims, the description and the figures. Features and details described in connection with the method according to the invention naturally also apply in connection with the controlling device according to the invention and vice versa in each case, so that reference is or can always be made mutually with respect to the disclosure of the individual aspects of the invention.

According to the invention, a method of controlling a thickness profile of a film track along a transverse direction is provided by means of a plurality of adjusting means for adjusting a slot opening of a discharge nozzle of a flat film machine. For this purpose, the method comprises the following steps:

- acquiring the thickness profile along the transverse direction of the film track transverse to a production direction of the flat film machine,
- comparing at least a partial section of the acquired thickness profile with a preset profile,
- determining at least one local profile deviation in a deviation section as a result of the comparison,
- generating at least one controlling intervention for the adjustment of at least one adjusting means in an intervention section different from the deviation section.

A method according to the invention thus aims in a known manner to ensure controlling of the thickness profile of a film track. In particular, corresponding preset values or preset profiles are to be adhered to. Like the known methods, this allows the thickness profile or profile deviations to be kept within certain limits so that the quality of the film track meets high quality requirements. In particular, profile deviations above the corresponding profile preset can be avoided or reduced, so that the formation of so-called piston rings or of undesirable thick spots and/or thin spots in edge sections of the film track, as explained at the beginning, can be avoided.

In contrast to the controlling options used so far, however, a method according to the invention is based on a defined distinction between the location of the local profile deviation on the one hand and the location of the controlling intervention for the adjustment of at least one adjusting means on the other hand. In the monitoring of the thickness profile, essentially continuous monitoring is carried out. Thus, the measurement of the thickness profile can be carried out simultaneously over the entire width of the film track, or it can be carried out sequentially in a shifting manner in the transverse direction. The corresponding determination can be made in a wide variety of ways, for example by transmission sensors, by feedback from the temperature information of the film track on a cooling roller, or by other thickness measurement systems. As soon as the thickness profile in the transverse direction is complete, the acquisition is carried out repeatedly, so that in the sense of the present invention a continuous or substantially continuous acquisition of the thickness profile along the transverse direction is possible.

By the corresponding determination possibility and by the comparison with the preset profile it becomes possible to evaluate the thickness profile in individual local sections with regard to the quality of the thickness profile. As soon as the profile deviation from the preset profile is large in a local section or lies outside the preset profile, the result of this local section of the profile deviation can be defined as a deviation section in the sense of the present invention as a result of the comparison. Therefore, based on the local profile deviation, the location of this local profile deviation in the form of the deviation section is additionally used as the basis for the subsequent controlling intervention. This subsequent controlling intervention is now generated on the one hand on the basis of the local profile deviation, i.e. qualitatively, for example, whether this is a thin spot or a thick spot in an undesirable manner in the thickness profile, and additionally by the location of the local profile deviation. In contrast to known solutions, the controlling intervention is not carried out, or at least not exclusively carried out within the deviation section, but rather in an intervention section which is different from the deviation section. It should also be noted, as will be explained in detail later, that the intervention section and the deviation section can of course comprise common sections in an overlapping manner. However, solutions are preferred, as will be explained later, in which the intervention section is formed separately or substantially separately from the deviation section.

According to the invention, it is now possible to insert a controlling intervention at a location other than the location of the local profile deviation. This provides a plurality of new controlling possibilities. In particular, it becomes possible to consider transverse relationships, i.e. the influence of adjusting means on neighboring regions of the thickness profile, in the controlling intervention. To explain this, such an adjusting situation is briefly described below by way of example. If the controlling system recognizes a thin spot in the thickness profile that has a local profile deviation above the preset profile, this leads to a corresponding controlling intervention. The aim of this controlling intervention is to avoid this undesired thin spot again, i.e. to provide an increase in thickness, i.e. a thickening, precisely in this local section of the profile deviation, namely the deviation section. For this purpose, more material must flow into this deviation section than was the case for determining the thickness profile. According to the invention, the controlling intervention can now adjust at least one adjusting means next to this deviation section in such a way that a reduction of the nozzle discharge slot is made available or generated next to this thin spot. The reduction of the nozzle discharge slot in the intervention section now leads to the fact that less flowable extrusion material of the film track can discharge there. Rather, with the same volume flow of the extrusion material, the extrusion material displaced in this way is distributed to the sections next to the intervention section, in particular to the left and to the right. As a result of the fact that the controlling intervention has taken this neighboring relationship between the intervention section and the deviation section into account when selecting the adjusting means and defining the intervention section, the displaced extrusion material now flows into the region of the deviation section and leads to the desired filling of the thin spot there.

It can therefore be summarized that in the context of the present invention, the controlling intervention explicitly intervenes at a different position than the location of the deviation in the form of the local profile deviation. This transverse correlation, i.e. this locally offset arrangement of the controlling intervention, leads both in a qualitative and in a quantitative way to a better, faster and more efficient cancellation of the local profile deviations. In particular, the transverse influences can be determined in advance when performing the controlling intervention and taken into account in the controlling intervention itself, so that an undesired controlling oscillation or regulation oscillations can be reduced or even completely avoided.

According to the invention, it is advantageous if, in the method according to the invention, the intervention section comprises a different extension along the transverse direction, in particular a greater extension than the deviation section. This leads to the fact that a large-area adjustment is possible, so that a continuous and, above all, smoother influence can be made available by the large-area adjustment of many adjusting means. Whereas in known solutions a small number of adjusting means had to provide a large influence on the corresponding local profile deviation, a significantly larger stretching can now be provided with separate intervention sections, so that with a smaller adjusting stroke at the adjusting means the smoother and, above all, lower-vibration regulation of the controlling intervention or the reduction of the local profile deviation is enabled.

It is also advantageous if, in a method according to the invention, at least two adjusting means are adjusted by the controlling means in the intervention section, in particular with different adjusting quality. Thus, the individual adjusting means, in particular in the form of thermal bolts, are arranged next to each other at uniform or substantially uniform distances. The response of two or more adjusting means now leads to the fact that, in particular in combination with a larger extension according to the preceding paragraph for the intervention section, the graduated adjustment or a smooth adjustment of the adjustment is enabled. A different adjustment quality can, for example, lead to the fact that the controlling interventions are carried out to a different extent on the individual intervention sections, so that the adjustment can lead to a smoother transition between regulated and unregulated regions in steps or with a different stroke.

It is also advantageous if, in a method according to the invention, the intervention section overlaps with the deviation section in the transverse direction of the film track. This means that the deviation section and the intervention section comprise a common overlapping section. Although the entire adjusting action is exerted in the intervention section and thus at least partially adjacent to the deviation section, a continuous transition, so to speak, can be provided here between the deviation section and the intervention section, so that space for material of the melt remains in particular in the region of the deviation section. In this embodiment, however, the deviation section is formed at least partially free of such a controlling intervention, so that corresponding space remains to provide melt material when shifting into adjacent regions or to take up melt material by shifting from the adjacent regions.

Further advantages can be achieved if, in a method according to the invention, the intervention section is directly or substantially directly adjacent to the deviation section in the transverse direction of the film track. This direct or laterally adjacent adjacency leads to the fact that, in particular in a combination of such adjacency on both sides, an enclosure of the deviation section by the intervention section is provided, so to speak. Thus, local deviations can be checked or controlled and/or regulated in a compact and synchronous manner. Furthermore, the direct adjacency leads to a simpler and direct correlation possibility between the intervention situation and the deviation situation.

It is also advantageous if, in a method according to the invention, the intervention section is spaced apart from the deviation section in the transverse direction of the film track. This is, so to speak, a security distance between the local deviation spot and the intervention section in order to avoid or reduce an undesired over-regulation or oscillating of the regulation. It should also be noted that the various correlations, such as overlapping, direct adjacency and spacing between the intervention section and the deviation section, can of course also be used in combination in terms of time or location within a regulation method. Thus, it is conceivable that the controlling intervention itself can distinguish or decide, depending on the actual local profile deviation, how far the intervention section should be spaced from the deviation section. The same applies, of course, to the positioning and geometric size of the intervention section in relation to the deviation section.

It is also advantageous if, in a method according to the invention, a group of at least two adjacent adjusting means are adjusted in the intervention section by the controlling intervention. Such a group-wise adjustment can be accompanied by quantitatively and/or qualitatively identical or different adjusting directions. Of course, the omission of an adjusting bolt between two adjacent adjusting means is also possible in principle. However, the adjacent controlling of adjusting means leads to an improved continuous adjustment, so that the advantages according to the invention and in particular the reduction of the regulation oscillation can be further improved.

It is also advantageous if, in a method according to the invention, the controlling intervention acts on at least two intervention sections on different sides of the deviation section in the transverse direction. This is to be understood as an influence on both sides, so that the controlling locks in or encloses the deviation section on both sides, so to speak. In this way, undesirable lateral transverse displacement beyond the deviation section can be avoided. If the local profile deviation is, for example, a thin spot, then by re-regulating adjusting means on both sides of this thin spot, extrusion material or melt material from both sides of this thin spot is now pressed into the region of the local profile deviation. This ensures that the melt material displaced into the thin spot from one side is not pushed out again on the other side of the thin spot, where it could provide undesirable controlling results. Thus, the arrangements on both sides of the deviation section allows the local results and effects of the controlling intervention to be better specified and distinguished from undesirable broadening of the controlling effect. Alternatively, conversely, a common intervention section can be arranged between two deviation sections. In other words, a common intervention section can be used to engage two separate deviation sections on either side of it. This can be used in particular for controlling a thickness profile in the two edge sections of the film track. In particular, this intervention effect is also symmetrical to the production direction of the film track.

A further advantage can be achieved if, in a method according to the invention, the controlling intervention and/or the at least two intervention sections are formed symmetrically or substantially symmetrically in the transverse direction to the deviation section. Thus, a symmetrical or substantially symmetrical controlling intervention can also be provided. The controlling capability, as well as the predictability, can be improved in this way. The symmetry can refer to the location, the geometry and the spacing of the controlling interventions or the intervention sections, but also to the quality and/or quantity of the adjustment of the adjusting means themselves.

It is also advantageous if, in a method according to the invention, the deviation section remains free of its own controlling intervention. In other words, the deviation section is designed to be controlling-free or adjusting-free, so that the controlling result is provided exclusively by a controlling influence from the adjacent intervention sections. This allows to provide a more accurate and improved predictability, since different controlling interventions do not or only partially overlap.

It can be further advantageous if, in a method according to the invention, the deviation section comprises its own controlling intervention. It should also be noted that the combination of controlling-free and controlling intervention in the deviation section can of course be provided at different local profile deviations or at different times in the sense of a present method. Of course, the different deviations on a film track at different times and/or at different locations can each be specifically assigned a corresponding controlling intervention.

A further advantage is when, in a method according to the invention, at least two controlling interventions are carried out at two different intervention sections in parallel or at least overlapping in time. Such a temporal overlap makes it possible to correlate different controlling interventions with each other, to compare their controlling results with each other and to provide a consideration of these different controlling interventions for a synchronous regulation. In the case of several local thickness deviations, this leads to a faster adaptation or a faster improvement of the thickness profile.

It is also advantageous if, in a method according to the invention, the necessary controlling interventions are prioritized in the case of at least two specific local profile deviations. Thus, the location of the local profile deviation with the maximum damage potential can be defined in order to provide the controlling intervention here with the highest priority. It is also possible to relate this damage potential to the stability of the production and/or the quality of the film product. Of course, the prioritization can also depend on other parameters, such as the overall thickness of the thickness profile. For example, in the edge section of a film track, an undesirable thick spot has a higher damage potential in the case of a thick film, while in the case of a particularly thin film, a corresponding thin spot has the highest damage potential.

It is also advantageous if, in a method according to the invention, a temporally preceding controlling intervention is taken into account when generating the controlling intervention. This can be provided with regard to the location and/or the result of this controlling intervention. Thus, the previous effect of a controlling intervention can be used to even actively act on undesired controlling oscillation or regulation oscillation here. A parallel intervention at another location can also be taken into account in the generation of the controlling intervention.

It is also advantageous if, in a method according to the invention, the time evolution of the thickness profile is taken into account when generating the controlling intervention. Thus, on the one hand, a learning effect can be achieved from the previous evolution of the thickness profile and, in particular, also in combination with the controlling interventions already generated, which can be stored back in corresponding databases. In particular, however, it is also possible to take into account the gradient of the thickness profile, i.e. the change in the deviation over time and thus the speed of change. This is particularly advantageous with regard to prioritizing the controlling intervention or the selection of quality and quantity, in order to be able to generate the controlling intervention in an even more targeted and effective manner.

Further advantages can be achieved if, in a method according to the invention, the time required for the adjustment of the adjusting means is taken into account when generating the controlling intervention. For example, so-called thermal bolts are used as adjusting means, which are subjected to a temperature and in this way generate an increase in temperature with a thermal expansion of the adjusting means. This allows the controlling intervention to be carried out simply and inexpensively, but leads to a time delay until the thermal expansion has reached the desired value. According to the invention, this time requirement can be taken into account as regulation latency or controlling latency when generating the controlling intervention.

Also an object of the present invention is a controlling device for carrying out a method for controlling a thickness profile of a film track along a transverse direction by means of a plurality of adjusting means for adjusting a slot opening of a discharge nozzle of the flat film machine. Such a controlling device comprises an acquisition module for acquiring a thickness profile and/or a temperature profile for an indirect conclusion on the thickness profile along the transverse direction of the film track transverse to a production direction of the flat film machine. Further, a comparison module is provided for a comparison of at least a partial section of the acquired thickness profile with a preset profile. Furthermore, the controlling device comprises a determination module for determining at least one local profile deviation in a deviation section as a result of the comparison. Further, a generation module is provided for generating at least one controlling intervention for the adjustment of at least one adjusting means in an intervention section different from the deviation section. The acquisition module, the comparison module, the determination module and/or the generation module are preferably designed for carrying out a method according to the invention. Thus, a controlling device according to the invention has the same advantages as have been explained in detail with reference to a method according to the invention.

BRIEF DESCRIPTION OF THE SEVERAL VIEWS OF THE DRAWINGS

Further advantages, features and details of the invention will be apparent from the following description, in which embodiments of the invention are described in detail with reference to the figures. In this connection, the features mentioned in the claims and in the description may each be essential to the invention individually or in any combination. The figures schematically show:

FIG. 1 an embodiment of a controlling device according to the invention,
FIG. 2 a detailed representation of the discharge nozzle,
FIG. 3 an embodiment of a thickness profile,
FIG. 4 an embodiment of a thickness profile with a local profile deviation,
FIG. 5 the embodiment of FIG. 4 with intervention possibilities,
FIG. 6 a possible correlation of the intervention sections and
FIG. 7 another possible correlation of the intervention sections.

DESCRIPTION OF SPECIFIC EMBODIMENTS OF THE INVENTION

Figure 1:
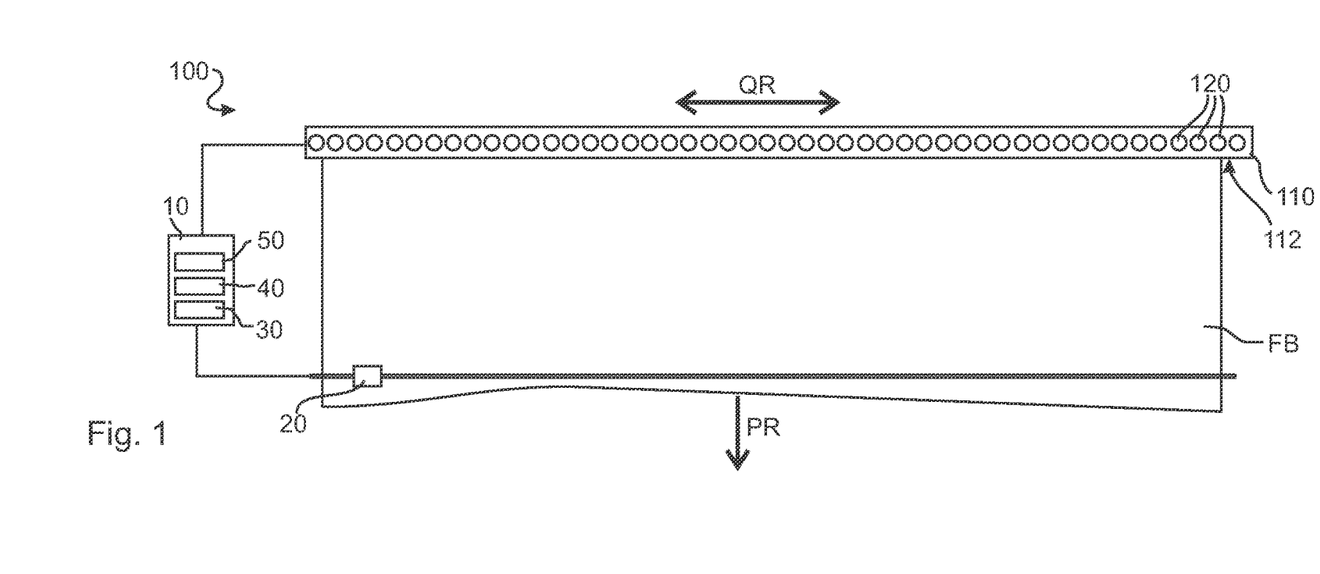

FIG. 1 shows in top view one possibility of a controlling device 10 in a flat film machine 100. In the top view, along the production direction PR, a film track FB is discharged from a discharge nozzle 110 in the form of extrusion material. Along the production direction PR, this film track FB now runs over a large cooling roller and over an extended roller system, in order to finally be wound up on a winding shaft. Using a corresponding measuring method, in this case an acquisition module 20, it is possible to monitor a thickness profile DP of the film track FB directly or indirectly, for example via a temperature profile. This can be provided continuously over the entire width in the transverse direction QR of the film track FB. However, it is also conceivable that the acquisition module 20 comprises a movable sensor which is moved in a reciprocating motion along the transverse direction QR from left to right over the film track FB. The information from the acquisition module 20 is combined within the controlling device 10 and subsequently processed in the comparison module 30 and in the determination module 40. The processing will be explained in more detail later. Starting from the generation module 50, a corresponding controlling intervention can now be generated and fed back to the flat film machine 100. This controlling intervention can now act in an adjusting manner on the adjusting means 120, formed here as thermal bolts, in order to achieve a change in the slot opening 112 of the discharge nozzle 110 there in a local manner.

Figure 2:
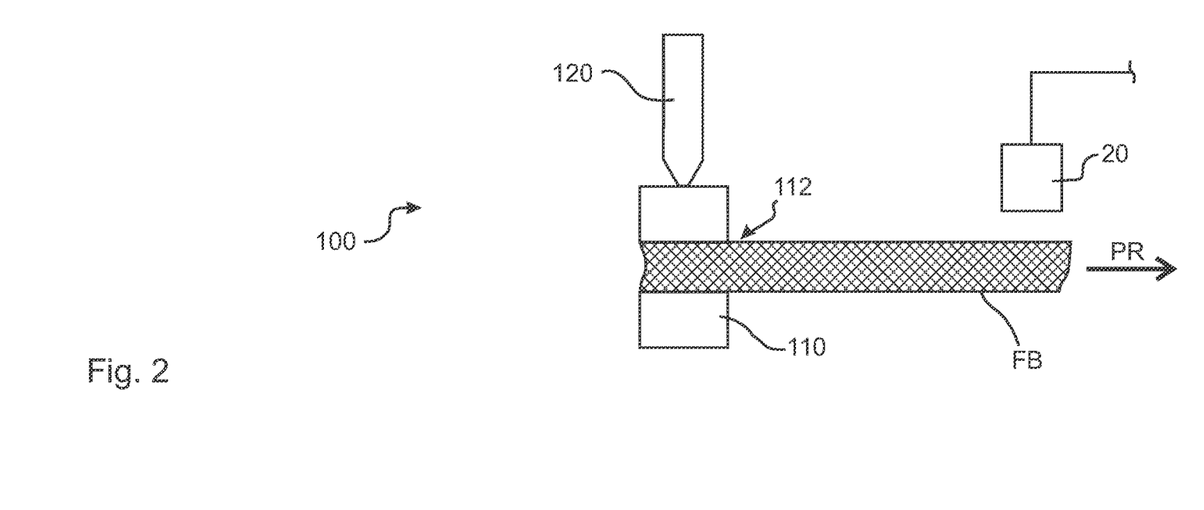

FIG. 2 shows a schematic cross-sectional view of FIG. 1. Here, it can be clearly seen how thermal loading of the adjusting bolt 120 can cause it to expand thermally. In the case of an abutment not shown, supported on the upper side, this results in the pin-like underside now pressing on the upper nozzle lip of the discharge nozzle 110, so that the slot opening 112 is reduced accordingly. In the opposite direction, i.e. when the adjusting bolt 120 cools down, it shortens so that the slot opening 112 opens further again due to the counter-pressure of the melt of the film track FB and accordingly a greater thickness becomes possible at this section of the film track FB. The acquisition module 20 is also shown here schematically.

Figure 3:
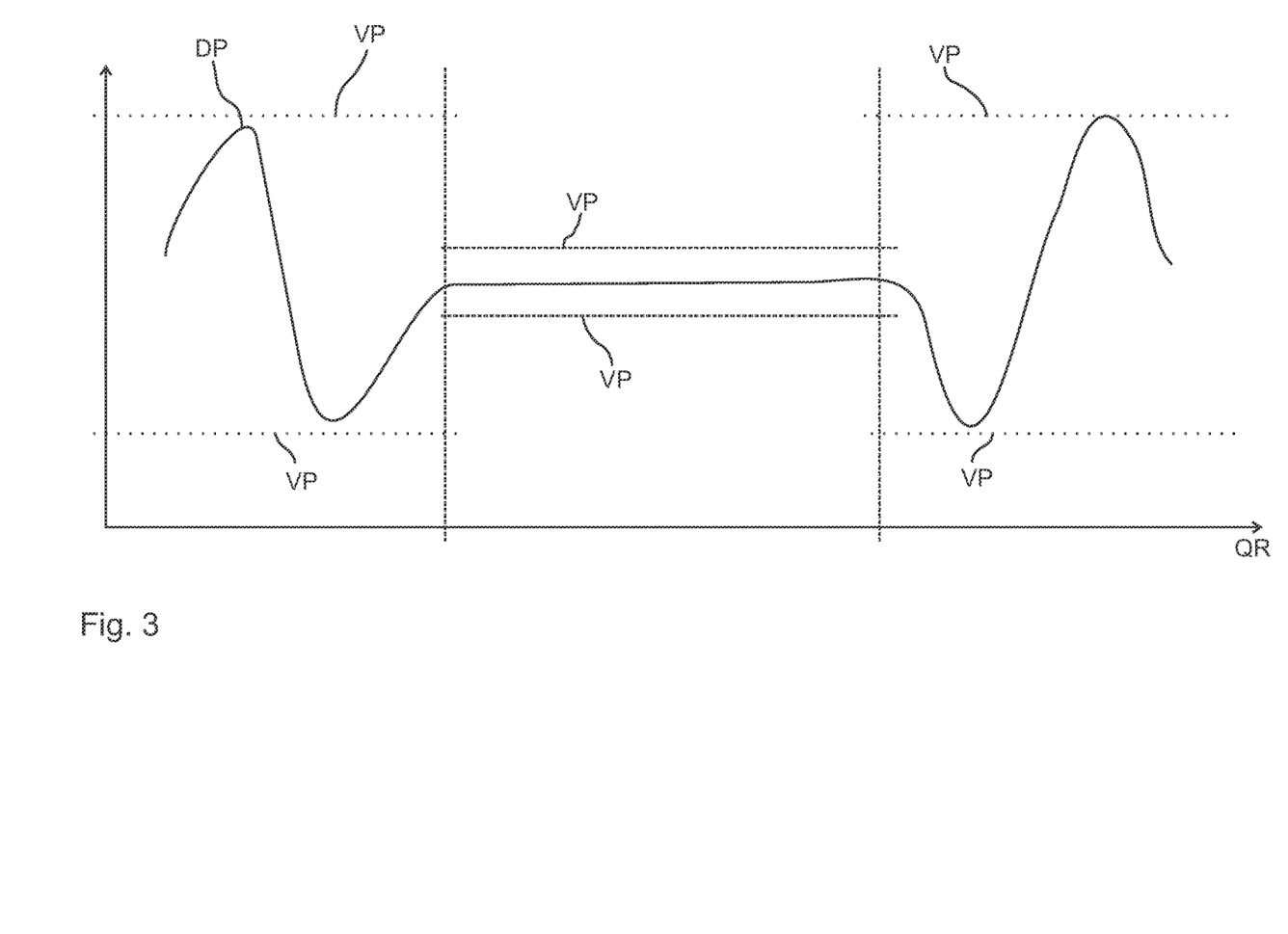

FIG. 3 shows a solution of how a thickness profile DP can look like over the entire transverse direction QR. Acquired by an acquisition module 20, two edge sections are shown here on the left and right, with a large thick spot and a corresponding thin spot. Between these two edge sections runs a continuous or substantially continuous shape of the thickness profile DP. It can be seen well here that the final film product FB is usually made or provided after the edge sections have been cut off. For this reason, different preset profiles VP with different threshold values can be provided for the different sections.

Figure 4:
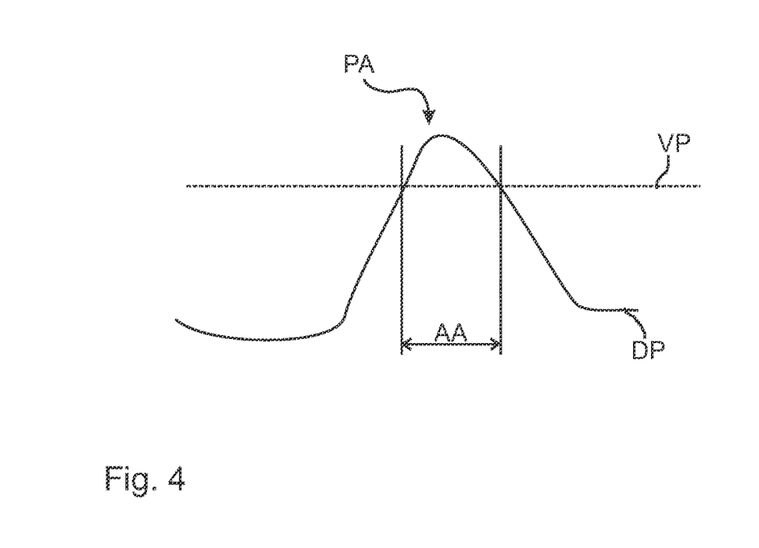
Figure 5:
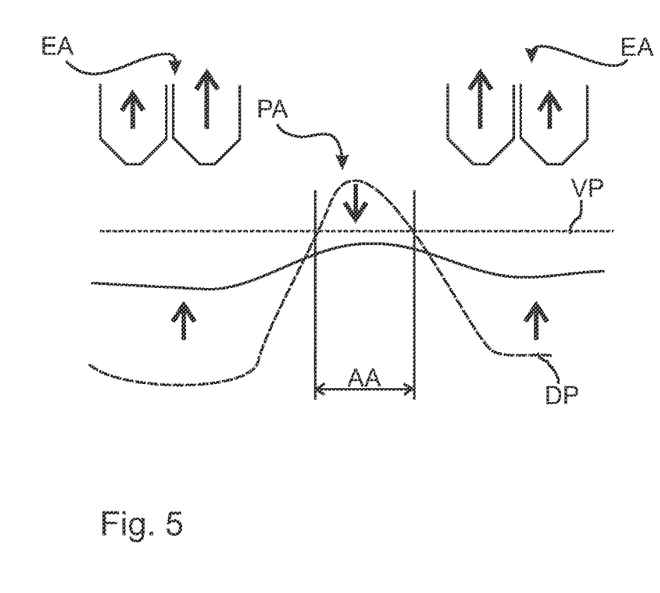

FIGS. 4 and 5 now show the controlling according to the invention. If a local profile deviation PA is recognized at a local point, for example by exceeding the preset profile VP, this section is defined as a deviation section AA. By means of a controlling intervention, it is now possible to define an intervention section EA to the left and right of the deviation section AA, shown in FIG. 5. This is a thickness spot in the deviation section AA that is to be reduced. The desired change in the thickness profile DP is shown here by the arrows, with the original formation of the thickness profile DP still shown as dashed in FIG. 5. In order to achieve this effect, the controlling intervention can now move the adjusting means 120 upwards here with different quantity and equally directed quality in the intervention sections EA adjacent on both sides, so that corresponding space is created to redistribute melt material from the deviation section AA into the adjacent intervention sections EA. As a result, the thickness profile DP flattens in the desired manner as a result of the controlling. For deviations in the edge section of the film track FB, the arrangement can also be exactly reversed, so that a common intervention section EA is located between two deviation sections AA, in particular in the edge section of the film track FB.

Figure 6:
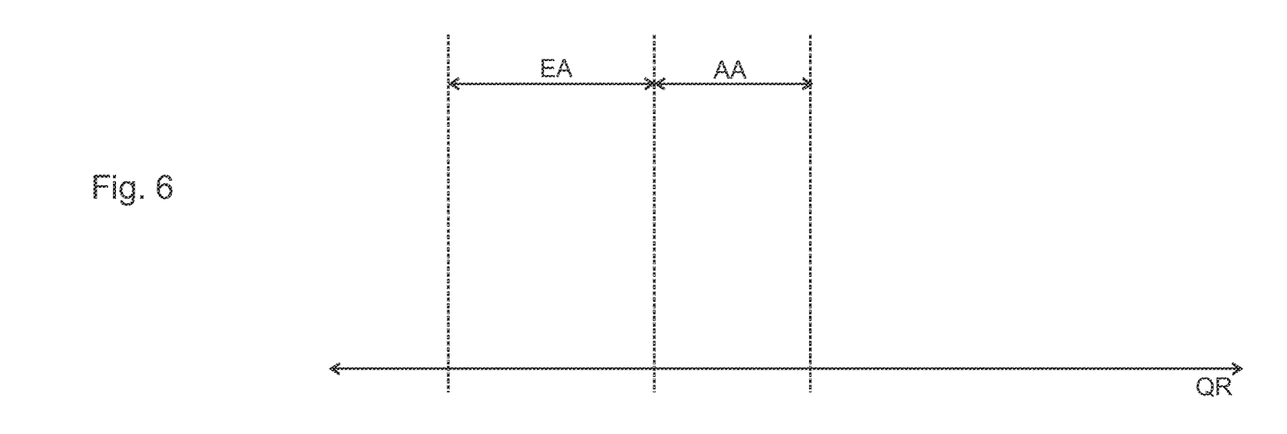
Figure 7:
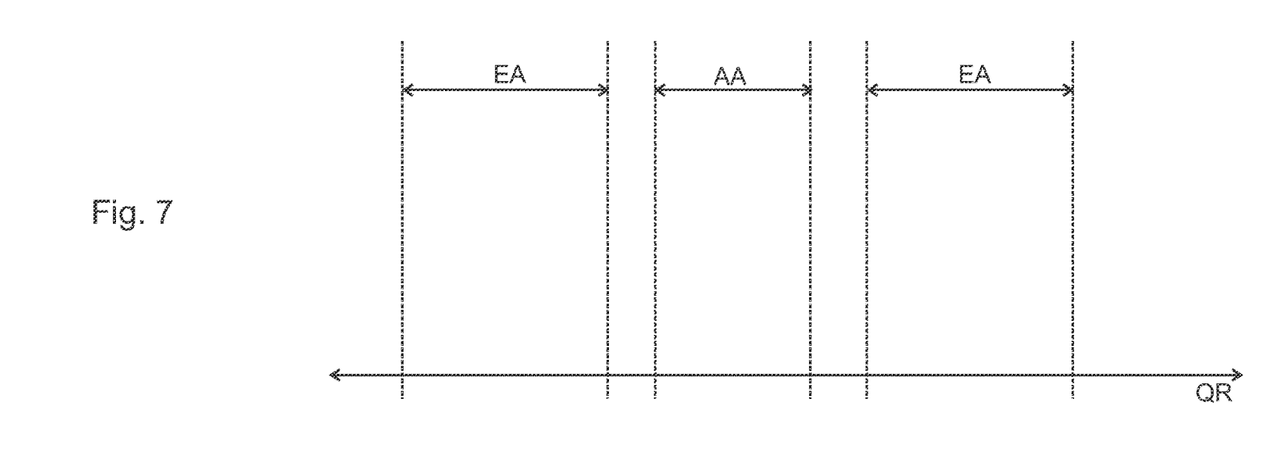

FIGS. 6 and 7 show different correlations in a localized manner. For example, according to FIG. 6, the intervention section EA can be directly or substantially directly laterally adjacent to a deviation section AA. However, it is also conceivable that, according to FIG. 7, a corresponding spacing in the form of a security distance is provided between the deviation section AA and the intervention section EA. FIG. 7 also shows an arrangement of two intervention sections EA on both sides, which are even formed in a symmetrical manner here.

The foregoing explanation of the embodiments describes the present invention exclusively in the context of examples. Of course, individual features of the embodiments can be freely combined with each other without leaving the scope of the present invention.

LIST OF REFERENCE SIGNS 10 controlling device
20 acquisition module
30 comparison module
40 determination module
50 generation module
100 flat film machine
110 discharge nozzle
112 slot opening
120 adjusting means
FB film track
DP thickness profile
VP preset profile
PA local profile deviation
AA deviation section
EA intervention section
QR transverse direction
PR production direction

The invention claimed is:

1. A method for controlling a thickness profile of a film track along a transverse direction by a plurality of adjusting actuators for adjusting a slot opening of a discharge nozzle of the flat film machine, comprising:
    acquiring a thickness profile along the transverse direction of the film track transverse to a production direction of the flat film machine,
    comparing at least a partial section of the acquired thickness profile with a preset profile,
    determining at least one local profile deviation in a deviation section as a result of the comparison,
    using a controlling device for generating at least one controlling intervention for the adjustment of at least one of the plurality of adjusting actuators in an intervention section different from the deviation section;
    wherein the controlling device takes into account a temporally preceding controlling intervention when generating the controlling intervention.

2. The method according to claim 1, wherein the intervention section comprises a different extension along the transverse direction than the deviation section.

3. The method according to claim 1, wherein at least two adjusting actuators are adjusted by the controlling intervention in the intervention section.

4. The method according to claim 1, wherein the intervention section overlaps with the deviation section in the transverse direction of the film track.

5. The method according to claim 1, wherein the intervention section is directly or substantially directly adjacent to the deviation section in the transverse direction of the film track.

6. The method according to claim 1, wherein the intervention section is spaced apart from the deviation section in the transverse direction of the falx track.

7. The method according to claim 1, wherein a group of at least two adjacent adjusting actuators are adjusted in the intervention section by the controlling intervention.

8. The method according to claim 1, wherein the controlling intervention acts on at least two intervention sections on different sides of the deviation section in the transverse direction or the controlling intervention acts on a common intervention section between two deviation sections in the transverse direction.

9. The method according to claim 8, wherein at least the controlling intervention or the at least two intervention sections are formed symmetrically or substantially symmetrically in the transverse direction to the deviation section or the two deviation sections are formed symmetrically about the one common intervention section.

10. The method according to claim 1, wherein the deviation section remains free of its own controlling intervention.

11. The method according to claim 1, wherein the deviation section comptises its own controlling intervention.

12. The method according to claim 1, wherein at least two controlling interventions are carried out at two different intervention sections in parallel or at least overlapping in time.

13. The method according to claim 1, wherein the necessary controlling interventions are prioritized in the case of at least two specific. local profile deviations.

14. The method according to claim 1, wherein a temporally preceding controlling intervention is taken into account when generating the controlling intervention.

15. The method according to claim 1, wherein the time evolution of the thickness profile is taken into account when generating the controlling intervention.

16. The method according to claim 1, wherein the time required for the adjustment of the adjusting actuators is taken into account when generating the controlling intervention.

17. The method according to claim 1, wherein the controlling device is configured to consider the time required for the adjustment of at least one of the plurality of adjusting actuators, when generating the controlling intervention.

* * * * *